United States Patent [19]
Hennessy et al.

[11] Patent Number: 6,138,182
[45] Date of Patent: Oct. 24, 2000

[54] PERIPHERAL IDENTIFICATION USING BYPASSABLE IMPEDANCES CONNECTED IN SERIES

[75] Inventors: Rick Hennessy, Lunenburg; Scott L. Pirdy, Westboro, both of Mass.

[73] Assignee: Digital Equipment Corporation, Marlboro, Mass.

[21] Appl. No.: 09/108,933

[22] Filed: Jun. 30, 1998

[51] Int. Cl.[7] ................................ G06F 13/00
[52] U.S. Cl. ........................................ 710/16
[58] Field of Search .................. 710/16, 8, 9; 320/106; 324/691

[56] References Cited

U.S. PATENT DOCUMENTS

| | | | |
|---|---|---|---|
| 4,575,714 | 3/1986 | Rummel | 340/468 |
| 5,146,172 | 9/1992 | Mehr-Ayin et al. | 324/691 |
| 5,767,500 | 6/1998 | Cordes et al. | 235/472 |
| 5,783,926 | 7/1998 | Moon et al. | 320/106 |
| 5,948,077 | 9/1999 | Choi et al. | 710/9 |
| 5,986,842 | 11/1999 | Matsumoto et al. | 360/69 |

FOREIGN PATENT DOCUMENTS 05102263  4/1993  Japan .

*Primary Examiner*—Thomas C. Lee
*Assistant Examiner*—Albert Wang
*Attorney, Agent, or Firm*—Conley, Rose & Tayon, P.C.

[57] ABSTRACT

A computer includes a multi-bit analog-to-digital converter, which is mounted within the computer's housing and has a digital output operatively connected to a bus port of the computer's processor. The computer also includes a local passive identification network that has a first node operatively connected to an analog input of the converter and further nodes respectively electrically connected to pins of a multi-contact local interface connector. A passive peripheral device identification network including a plurality of nodes each electrically connected to a multi-contact peripheral identification connector can mate with the multi-contact local connector.

19 Claims, 3 Drawing Sheets

PERIPHERAL IDENTIFICATION USING BYPASSABLE IMPEDANCES CONNECTED IN SERIES

FIELD OF THE INVENTION

This invention relates generally to methods for identifying peripheral devices in computers, such as portable computers.

BACKGROUND OF THE INVENTION

Computers usually have peripheral slots that can interface with different types of peripheral devices, such as disk drives, modems, or network interfaces. Some computers can identify their peripherals by reading a binary number from a number of digital identification lines on the peripheral. This binary number can assist the computer in configuring its software settings so that it can communicate with the peripheral.

SUMMARY OF THE INVENTION

In one general aspect, the invention features a computer that includes a multi-bit analog-to-digital converter, which is mounted within the computer's housing and has a digital output operatively connected to a bus port of the computer's processor. The computer also includes a local passive identification network that has a first node operatively connected to an analog input of the converter and further nodes respectively electrically connected to pins of a multi-contact local interface connector.

The computer further can further include a passive peripheral device identification network including nodes each electrically connected to a multi-contact peripheral identification connector constructed and adapted to mate with the multi-contact local connector. The passive peripheral device identification network can include at least three nodes connected to one of three contacts in the peripheral connector and the local passive network can include at least three nodes connected to one of three contacts in the local connector. The local passive network can have at least one reference node operatively connected to a reference source. The reference node can derive its reference from a battery contact mounted within the housing. The local passive network is a resistor ladder made up of a series connection of at least a first ladder resistor, a second ladder resistor, and a third ladder resistor, with the plurality of further nodes including a node separating the first and second resistors and a node separating the second and third resistors. The computer can include circuitry operative to monitor at least one contact of the local connector to detect insertion or removal of a peripheral device from the local connector and to issue an interrupt request to the processor upon detecting the insertion or the removal. The analog-to-digital converter can be at least a three-bit converter. The analog-to-digital converter can be at least an eight-bit converter. The computer can be a portable with the housing being a clam-shell housing. The connector can be a drive bay connector that also includes contacts for drive interface signals.

In another general aspect, the invention features a peripheral device for interfacing with a computer that includes a peripheral service unit and a passive identification network having a plurality of nodes and providing an impedance between at least two of those nodes, with at least one of the two nodes being other than a power node. The peripheral device also includes a set of connector contacts that includes computer bus contacts operatively connected to the peripheral service unit, and at least two identification contacts respectively operatively connected to the at least two nodes of the passive network.

The passive identification network can have at least a third node and provides an impedance between at least the two nodes and the third node, and the set of connector contacts can include at least a further identification contact connected to the third node. The passive identification network can include jumpers, such as a jumper between the two nodes. The set of connector contacts can include at least two further identification contacts, with the two identification contacts and the two further identification contacts sitting in adjacent positions within the set of connector contacts. The set of connector contacts can form part of a single connector. The peripheral service unit can be a storage drive. The passive network can be made up of printed conductors on a substrate. The substrate can be a flexible cable between the peripheral service unit and the set of connector contacts. The set of connector contacts can form part of a single-piece connector. The impedance of the network can have a value selected from one of a predetermined number of values that each adjust a voltage presented to an analog-to-digital converter to one of a number of corresponding different predetermined voltages. The set of connector contacts can include further identification contacts reserved for identification purposes.

In a further general aspect, the invention features a computer that includes means for measuring a voltage at a point within a passive network in the computer that shares at least two nodes with a passive network within the peripheral device, and means for selecting, from a plurality of possible identities, an identity for the peripheral device based on the voltage measured in the step of measuring.

The computer can include means for interrupting a processor in the computer upon detecting a voltage change by the means for measuring, and for updating the identity for the peripheral device. The means for selecting can be operative to select from at least six possible identities.

In another general aspect, the invention features a method of identifying peripheral devices to a computer that includes measuring a voltage at a point within a passive network in the computer that shares at least two nodes with a passive network within the peripheral device, and selecting, from a plurality of possible identities, an identity for the peripheral device based on the voltage measured in the step of measuring.

The method can also include interrupting a processor in the computer upon detecting a voltage change in the step of measuring, and updating the identity for the peripheral device. The step of selecting can select from at least six possible identities. The step of measuring can measure a voltage at a point within a passive network in the computer that shares at least three nodes with a passive network within the peripheral device.

In a further general aspect, the invention features a method of identifying peripheral devices to a computer that includes providing a service device on a peripheral device, determining a correspondence between one of a predetermined plurality of identification codes for the peripheral device and an impedance of a passive network to be connected to at least a plurality of contacts on a computer, and providing the passive network on the peripheral device with the impedance determined in the step of determining.

The method can include connecting the passive network and the service device to the computer, with the step of connecting causing the voltage at an input of an analog-to-digital converter to reach a predetermined level corresponding to the identification code. The method can include generating an interrupt when a change in voltage is detected.

Systems according to the invention may be advantageous in that they allow a number of different types of peripherals to be identified using relatively few pins. And by using circuit board traces to perform the identification, such systems can accomplish this objective at a very low expense.

DETAILED DESCRIPTION OF AN ILLUSTRATIVE EMBODIMENT

Figure 1:
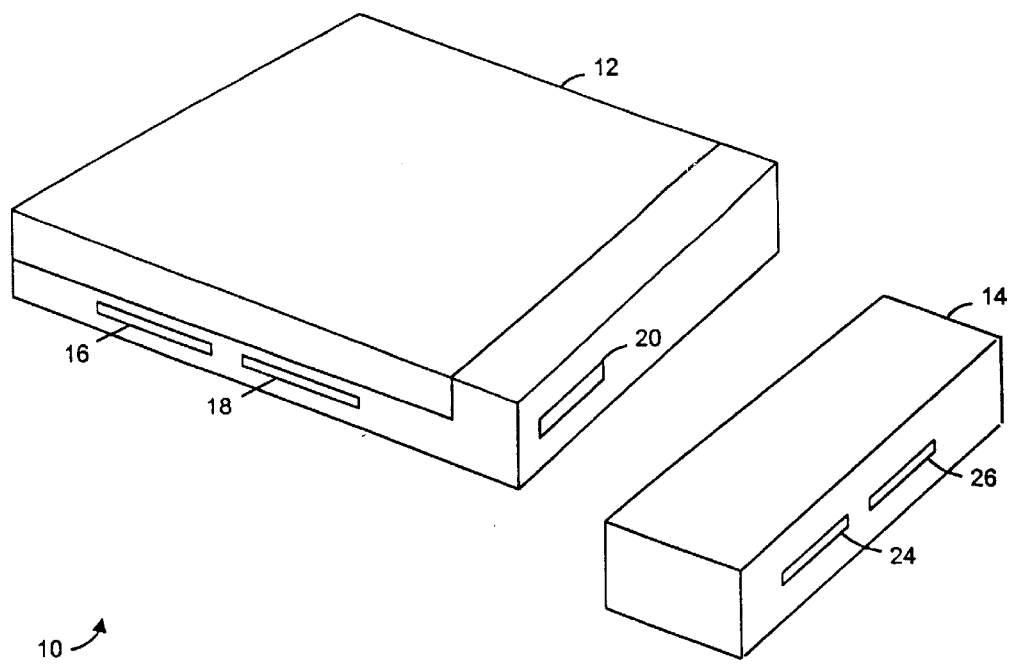
FIG. 1 is a perspective outline drawing of relevant portions of a portable computer according to the invention.

Referring to FIG. 1, a portable computer system 10 according to the invention includes a main computer unit 12 and a docking station 14. The main computer unit is a self-sufficient, battery-powered computer with a processor, memory, and user interface hardware, such as a keyboard, touch pad, and display screen. The main computer unit's housing can be in the form of a clam-shell case with the keyboard and display being mounted in opposing hingedly attached portions. A docking connector 20 is also located on the main computer unit, and mates with a corresponding docking connector on the docking interface.

The main computer unit 12 defines at least a drive bay 16 and a peripheral interface slot 18. Each of these includes a connector that allows a peripheral device, such as a floppy disk drive, network interface, or modem, to be inserted and carried with the computer. They can each be rectangular parallelepiped cavities in the housing, with their connectors being located on an opposite face from an opening in the housing formed by the cavity, such that drives or other peripheral devices can slide into the slot and mate with the connector in a single stroke. The docking interface similarly includes at least one drive bay 24 and a peripheral slot 26, which can follow similar form factors and electrical specifications to those in the main computer unit, allowing drives and peripheral devices to be swapped between the slots in the main unit and the slots in the docking station.

Figure 2:
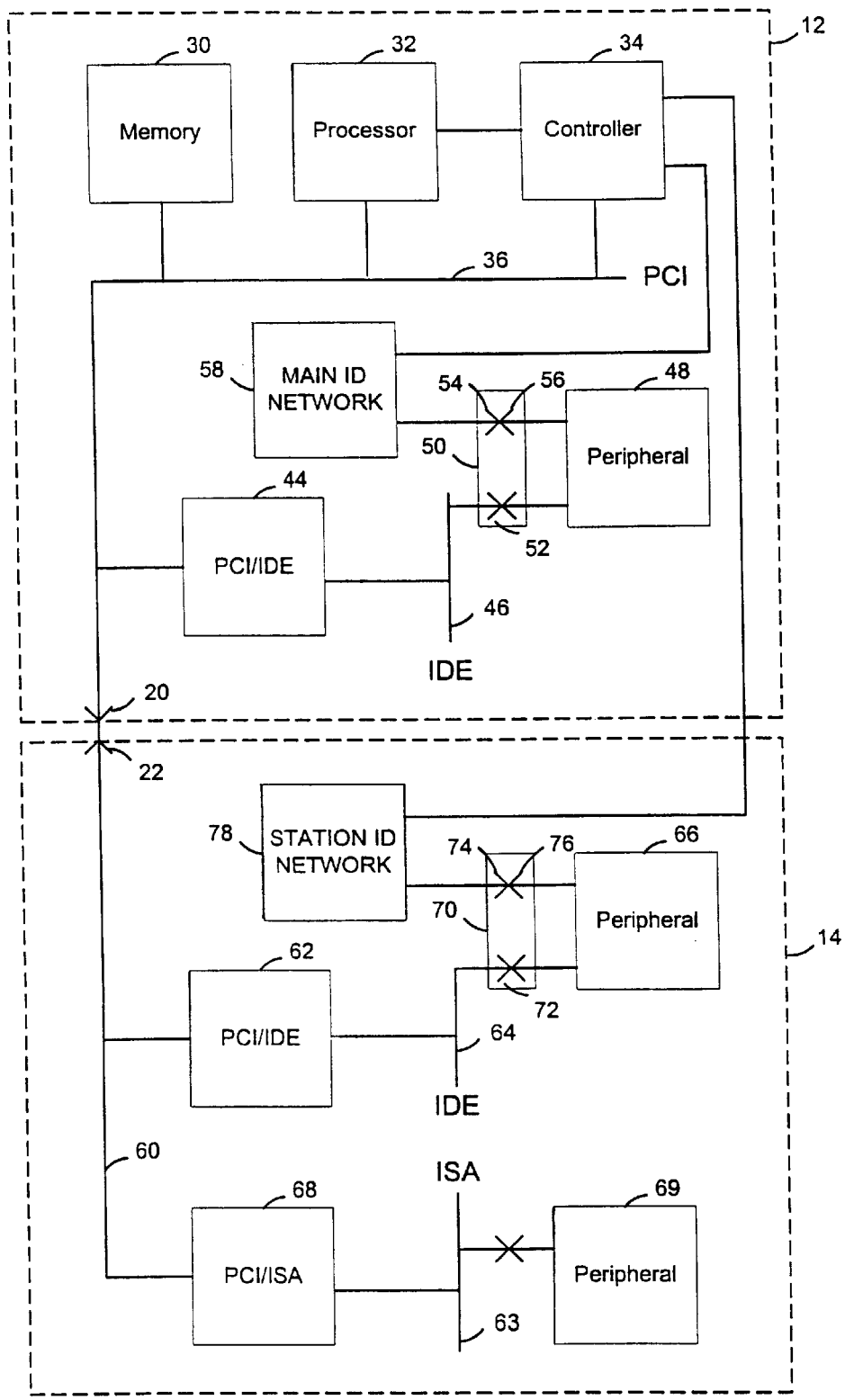
FIG. 2 is a block diagram of the portable computer of FIG. 1.

Referring also to FIG. 2, the main computer unit 12 includes a processor 32 and memory 30 each having a port operatively connected to a first bus 36. The first bus can be a PCI bus which is a mezzanine bus that has burst transfer and automatic configuration capabilities. The main unit can also include a system controller 34 that has at least first and second analog input lines, and an interrupt request line operatively connected to an interrupt line of the processor 32.

A first bus bridge 44 is also operatively connected to the first bus 36 and to a second bus 46. The second bus can be an Integrated Drive Electronics (IDE) interface bus, which is a bus based on the ISA (Industry Standard Architecture) bus, and is designed to handle power and data signal interfaces between a computer and integrated disk controller and drive. This bus can be connected to a peripheral 48, such as a hard drive or a CD-ROM drive, via a first ganged connector pair 50 in the drive bay 16. Further devices and bridges (not shown) can also be provided within the main computer unit.

The first bus 36 within the main unit 12 is also operatively connected to the docking connector 20. This docking connector can mate with the second docking connector 22, which is mounted on the housing of the docking station 14. The second docking connector is operatively connected to a first bus 60 within the docking station.

A first bridge 62 is operatively connected to the first bus 60 in the docking station and to a second bus 64, which is operatively connected to a first peripheral 66, such as a hard drive. This second bus can also be an IDE bus that can be operatively connected to the second peripheral device via a second ganged connector pair 70 in the drive bay 24 in the docking station 14. A second bridge 68 is also connected to the first bus of the docking station and to a third bus 63 of the docking station. The third bus can be an ISA bus, which is an extension of the IBM-XT bus architecture that operates at 8 MHz and allows for bus mastering.

Figure 3:
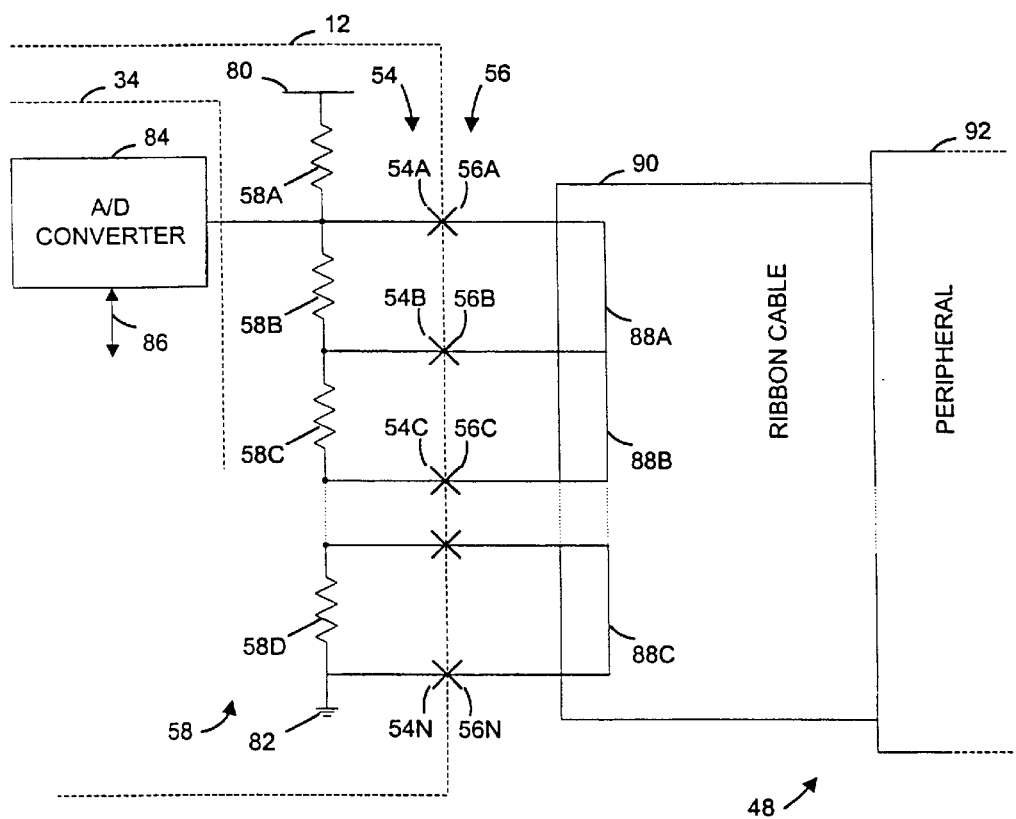
FIG. 3 is a diagram illustrating the peripheral device interface between the computer of FIG. 1 and a peripheral device.

Referring also to FIG. 3, the drive bay 16 in the main computer unit includes a main local passive identification network 58. Similarly, the drive bay 24 in the docking station 14 includes a docking station local passive identification network 78. Each of these networks is operatively connected to one of the analog inputs of an analog-to-digital converter (ADC) 84. The ADC has a digital output operatively connected to a bus 86, which can be one of the various buses in the main unit 12 or in the docking station 14.

The ADC 84 can be a multi-bit ADC with a multiplexed analog input and can be part of the system controller 34. In one embodiment the ADC is part of an H83434 microcontroller integrated circuit available from Hitachi, Ltd., which performs various system functions including keyboard decoding, battery charging, LCD status indicator control, and temperature monitoring. This controller includes an 8-bit ADC capable of detecting up to 256 levels.

The local passive identification network 58 can be a resistor ladder including first 58, second 58B, third 58C . . . and nth 58N resistors connected in series between a reference voltage line 80 and ground 82. The reference voltage and ground can be the same as those used to power the processor, and can derive their levels from the computer's battery directly or via further circuitry, such as a DC-DC converter. The first resistor has a first pin operatively connected to the reference voltage line and a second pin operatively connected to the analog input of the ADC. The second pin is also operatively connected to a first contact 54A of a multi-contact local connector identification portion 54 of the ganged connector pair 50. Similarly the node separating the first and second resistors is operatively connected to a second contact 54B of the local connector portion, and the node separating the second and third resistors is operatively connected to a third contact 54C of the local connector portion.

The peripheral device 48 includes a peripheral service unit 92, such as a disk drive, modem circuit, or network interface circuit that is operatively connected to an interface cable 90. The cable is connected to a peripheral identification connector 56 portion of the ganged connector pair 50, which mates with the local connector 54. One or more jumpers 88A, 88B, 88C . . . 88N can be operatively connected between pairs of the pins 56A, 56B, 56C . . . 56N in the peripheral identification connector. The ganged connector pair 50 also includes a pair of peripheral interface connector portions 52 that can provide interface signals to the peripheral. Like the main drive bay 16, the drive bay 24 in the docking station 14 includes peripheral interface portions 72 and identification portions 74 in its gauged connector pair 70.

In an embodiment where the interface cable is a printed flexible cable, the jumpers can be defined as printed conductors on the cable. It is also possible to employ other passive devices having an impedance, such as resistors, instead of jumpers, although this will be likely to increase the cost of the peripheral. The identification pins of the local connector 54 and the peripheral identification connector 56 preferably form a set of adjacent pins within a pair of larger one-piece connectors that also provide the peripheral interface connector portion 52 between the processor 32 and the peripheral 48.

In one embodiment, six pins are provided in three adjacent pairs within a three-by-two cluster in a two-row, 90-pin connector that also carries the IDE and floppy drive signals. Resistor values are: 10K, 30K, 10K, 5.1K, 3K, 2.2K and 820, for R1–R7, respectively. Devices supported include hard drives, CD-ROM drives, DVD drives, ZIP drives, standard floppy drives and LS120 floppy drives, which are each identified by bypassing one or more of the resistors R2–R7.

Figure 4:
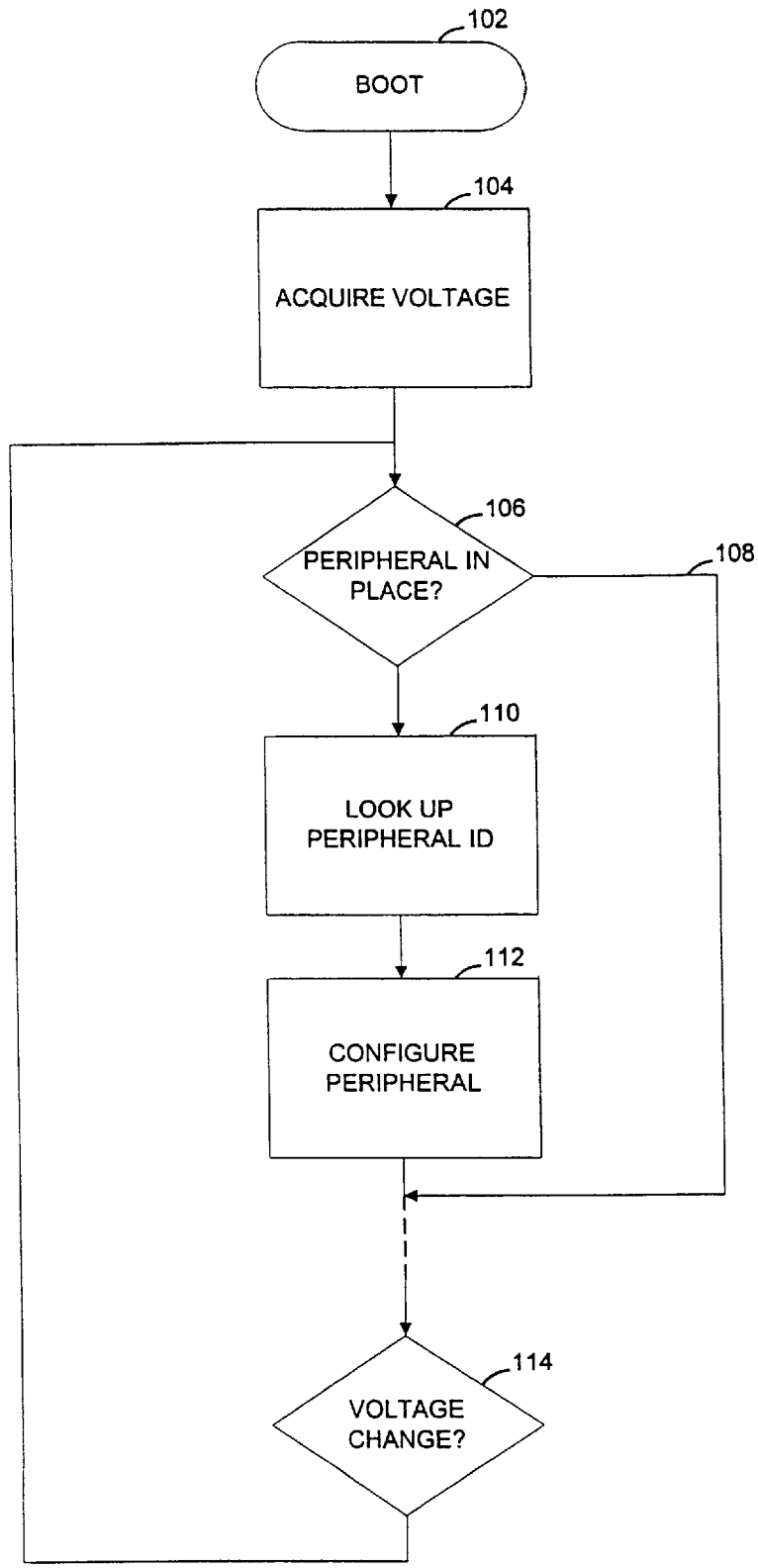
FIG. 4 is a flowchart illustrating the operation of the portable computer of FIG. 1.

In operation, referring also to FIG. 4, the computer's boot routine can call on an identification routine to determine what peripherals are attached to the various buses (step 102). The portion of this identification routine that services the drive bays begins by obtaining a conversion value of the voltage on the analog input of the ADC 84 (step 104). This voltage is then tested (step 106), and if it is determined to be equal to the series combination of all but the first resistor divided by the series combination of all of the resistors, taking the tolerance of the resistors into account, the identification routine determines that no peripheral is connected to the interface slot (branch 108). Alternatively, a dedicated peripheral present signal can be monitored to determine whether the peripheral is present before resistor values are monitored.

If the evaluation of the acquired voltage indicates that there is a peripheral attached to the interface slot, the voltage value is compared with voltage values in a table to determine the nature of the peripheral (step 110). The operating system can then configure itself for that peripheral (step 112). After the configuration, the boot routine can complete its operations and the computer can perform computations for the user. Note that although table look-up is quite straightforward, other methods can also be used to identify the peripheral, such as hash functions.

The boot routine can also be called when a hot swap operation is detected. A hot swap operation occurs when the user removes or inserts a peripheral into one of the peripheral interface slots. When a hot swap operation takes place, the voltage at the analog input of the ADC 84 will change due to a change in impedance of the overall passive network attached to it, causing the micro-controller to issue an interrupt signal to the processor 32 via the system controller 34. This interrupt will call the identification routine, which will again determine whether the peripheral is in place (step 106), look up the peripheral if it is found (step 110), and configure that peripheral (step 112).

For N pins used in this identification method, $2^N$ combinations are possible, if only jumpers are used. Each jumper can span one or more resistors and one or more jumpers can be provided. By selecting the resistors appropriately, (e.g., by a binary progression) the various different combinations of jumpers can be detected.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A computer, comprising:

a housing, a processor mounted within the housing and having a bus port, a multi-bit analog-to-digital converter mounted within the housing, having an analog input and having a digital output operatively connected to the bus port, a local passive identification network having a first node operatively connected to the analog input, and a plurality of further nodes, wherein the local passive network is a resistor ladder made up of a series connection of at least a first ladder resistor, a second ladder resistor, and a third ladder resistor, and wherein the plurality of further nodes includes a node separating the first and second resistors and a node separating the second and third resistors., and a multi-contact local interface connector having a plurality of pins respectively electrically connected to the plurality of further nodes in the first passive network.

2. The computer of claim 1 further comprising a passive peripheral device identification network including a plurality of nodes each electrically connected to a multi-contact peripheral identification connector constructed and adapted to mate with the multi-contact local connector.

3. The computer of claim 2 wherein the passive peripheral device identification network includes at least three nodes connected to one of three contacts in the peripheral connector and the local passive network includes at least three nodes connected to one of three contacts in the local connector.

4. The computer of claim 1 wherein the local passive network has at least one reference node operatively connected to a reference source.

5. The computer of claim 4 wherein the reference node derives its reference from a battery contact mounted within the housing.

6. The computer of claim 1 further including circuitry operative to monitor at least one contact of the local connector to detect insertion or removal of a peripheral device from the local connector and to issue an interrupt request to the processor upon detecting the insertion or the removal.

7. The computer of claim 1 wherein the analog-to-digital converter is at least a three-bit converter.

8. The computer of claim 1 wherein the analog-to-digital converter is at least an eight-bit converter.

9. The computer of claim 1 wherein the computer is portable and wherein the housing is a clam-shell housing.

10. The computer of claim 1 wherein the connector is a drive bay connector that also includes contacts for drive interface signals.

11. A computer that comprises:

an identification network having a plurality of predetermined impedances coupled in series between a reference node and a final node, wherein the plurality of impedances includes a reference impedance coupled between the reference node and a first node, and a first impedance coupled between the first node and a second node;

a peripheral interface connector having dedicated pins respectively connected to the first node, the second node, the final node, and any other nodes between impedances in the plurality of impedances connected in series;

a controller coupled to the first node and configured to convert a first node voltage into a binary representation indicative of the presence and type of peripheral attached to the peripheral interface connector; and a processor coupled to the controller, wherein the processor is configured to query the controller to determine the presence and type of peripheral attached to the peripheral interface connector.

12. The computer of claim 11, wherein the reference node and the final node are coupled to predetermined voltages.

13. The computer of claim 11, wherein the plurality of impedances other than tho reference impedance consists of resistors having resistances according to a binary progression.

14. The computer of claim 11, wherein the plurality of impedances includes a second impedance coupled between the second node and a third node.

15. The computer of claim 11, wherein the controller is configured to monitor the first node voltage and is configured to assert an interrupt to the processor if a change in the node voltage is detected.

16. The computer of claim 11, wherein the plurality of impedances includes six resistors in addition to the reference impedance.

17. The computer of claim 11, further comprising:

a peripheral component attached to the peripheral interface connector, wherein the component includes one or more short-circuits coupled to the dedicated pins, and wherein each of said one or more short-circuits is configured to bypass one or more of said plurality of impedances.

18. A method of identifying peripheral devices in a computer system that includes a peripheral-receiving unit having a plurality of series-connected resistors, wherein the method comprises:

inserting a peripheral device into the peripheral-receiving unit, thereby bypassing a set of resistors in the plurality of series-connected resistors, wherein the plurality of series-connected resistors is configured such that each unique set of bypassable resistors is uniquely identifiable by an output voltage of an output node; and converting the output voltage to a digital representation.

19. The method of claim 18, further comprising:

applying the digital representation to a lookup table to identify a peripheral device that is bypassing said set of resistors.

\* \* \* \* \*